(12) United States Patent
Sugiyama et al.

(10) Patent No.: US 12,371,531 B2
(45) Date of Patent: Jul. 29, 2025

(54) RESIN COMPOSITION, FORMED ARTICLE, KIT, AND METHOD FOR MANUFACTURING FORMED ARTICLE

(71) Applicant: MITSUBISHI ENGINEERING-PLASTICS CORPORATION, Tokyo (JP)

(72) Inventors: Masahide Sugiyama, Hiratsuka (JP); Fumihito Okamoto, Hiratsuka (JP)

(73) Assignee: GLOBAL POLYACETAL CO., LTD., Tokyo (JP)

( * ) Notice: Subject to any disclaimer, the term of this patent is extended or adjusted under 35 U.S.C. 154(b) by 771 days.

(21) Appl. No.: 17/423,276

(22) PCT Filed: Jan. 17, 2020

(86) PCT No.: PCT/JP2020/001457
§ 371 (c)(1),
(2) Date: Jul. 15, 2021

(87) PCT Pub. No.: WO2020/149398
PCT Pub. Date: Jul. 23, 2020

(65) Prior Publication Data
US 2022/0089816 A1     Mar. 24, 2022

(30) Foreign Application Priority Data
Jan. 18, 2019     (JP) ................. 2019-006978

(51) Int. Cl.
*C08G 69/26*     (2006.01)
*C08K 13/04*     (2006.01)
*C08L 77/06*     (2006.01)

(52) U.S. Cl.
CPC ............ *C08G 69/265* (2013.01); *C08K 13/04* (2013.01); *C08L 77/06* (2013.01); *C08L 2207/04* (2013.01)

(58) Field of Classification Search
CPC ....... C08G 69/265; C08K 13/04; C08L 77/06; C08L 2207/04
See application file for complete search history.

(56) References Cited

U.S. PATENT DOCUMENTS

| | | | |
|---|---|---|---|
| 5,133,316 | A | 7/1992 | Kasai et al. |
| 2019/0002692 | A1 | 1/2019 | Okamoto |

FOREIGN PATENT DOCUMENTS

| | | |
|---|---|---|
| CN | 108473762 A | 8/2018 |
| EP | 0337443 A1 | 4/1989 |
| JP | 1-263151 A | 10/1989 |
| JP | 4-25561 A | 1/1992 |
| JP | 2002-97363 A | 4/2002 |

(Continued)

OTHER PUBLICATIONS

English machine translation of WO2015022404. (Year: 2015).*

(Continued)

*Primary Examiner* — John E Uselding
(74) *Attorney, Agent, or Firm* — Birch, Stewart, Kolasch & Birch, LLP (57) ABSTRACT

To provide a resin composition that contains a glass fiber, but having reduced warpage of a formed article and high transmittance; as well as a formed article, a kit, and a method for manufacturing a formed article using the same. The polyamide resin composition contains a polyamide resin, a glass fiber, a light-transmitting dye, and muscovite.

15 Claims, 1 Drawing Sheet

(56) References Cited

FOREIGN PATENT DOCUMENTS

| JP | 2008-308526 A | 12/2008 | |
| JP | 2010-248406 A | 11/2010 | |
| JP | 2019-6840 A | 1/2019 | |
| JP | 2022-127208 A | 8/2022 | |
| WO | WO-2015022404 A1 * | 2/2015 | .............. C08J 5/043 |

OTHER PUBLICATIONS

English machine translation of Jp 2010-248406A. (Year: 2010).*
Chinese Office Action and Search Report for corresponding Chinese Application No. 202080009664.8, dated Sep. 7, 2022, with an English translation.
Extended European Search Report for corresponding European Application No. 20741546.4, dated Oct. 10, 2022.
Japanese Office Action for corresponding Japanese Application No. 2020-566499, dated Aug. 8, 2023, with English translation.
Japanese Notice of Reasons for Refusal for corresponding Japanese Application No. 2020-566499, dated Apr. 11, 2023, with an English translation.
International Preliminary Report on Patentability and Written Opinion of the International Searching Authority (Form PCT/IB/373 and PCT/ISA/237) for International Application No. PCT/JP2020/001457, dated Jun. 16, 2021, with English translation of the Written Opinion.
International Search Report (Form PCT/ISA/210) for International Application No. PCT/JP2020/001457, dated Mar. 31, 2020, with English translation.
South Korean Office Action for corresponding South Korean Application No. 10-2021-7022427, dated Sep. 4, 2024, with an English translation.
Korean Office Action for corresponding Korean Application No. 10-2021-7022427, dated Feb. 20; 2025, with an English translation.

* cited by examiner

RESIN COMPOSITION, FORMED ARTICLE, KIT, AND METHOD FOR MANUFACTURING FORMED ARTICLE

TECHNICAL FIELD

This invention relates to a resin composition that contains a polyamide resin, a formed article, a kit, and a method for manufacturing a formed article. The polyamide resin composition of this invention is principally used for a resin composition placed on the light transmission side (light-transmitting resin composition) in laser welding.

BACKGROUND ART

Polyamide resin, a representative engineering plastic, is easy to process, and further excels in mechanical property, electrical property, heat resistance, and other physicochemical properties, and is therefore widely applied to vehicle component, electrical/electronic equipment parts, other precision equipment parts and so forth. Also morphologically intricate parts have increasingly been manufactured by using the polyamide resin, so that parts having a hollow section, such as intake manifold, have been bonded with the aid of a variety of welding technologies including adhesive welding, vibration welding, ultrasonic welding, hot plate welding, injection welding and laser welding.

Adhesive welding has, however, suffered from loss of time due to the curing time, and environmental impact such as peripheral pollution. Ultrasonic welding and hot plate welding have been reported to damage the product due to vibration and heat, and to require post-process for removing abrasion powder or produced burr. Injection welding has often required to use specialized dies and molding machines, and has been limited to use of materials only with high fluidity.

On the other hand, laser welding is a method of bonding, by which a laser light transmitting (also referred to as non-absorbing or weakly-absorbing) resin member (occasionally referred to as "transmitting resin member", hereinafter), and a laser light-absorbing resin member (occasionally referred to as "absorbing resin member", hereinafter) are brought into contact and welded, thereby bonding both resin members. More specifically, laser light is irradiated through the transmitting resin member onto the joint face, so as to melt, and then bond, the absorbing resin member that forms the joint face with the light energy. Since laser welding produces neither abrasion powder nor burr, causes less damage on the product, and since polyamide resin per se has a relatively high laser transmittance, so that recent attention has been focused on process of polyamide resin products with the aid of laser welding technology.

The transmitting resin member is usually formed of a light-transmitting resin composition. As this sort of light-transmitting resin composition, Patent Literature 1 describes a polyamide resin composition for use in laser welding, having blended therein 100 parts by weight of (A) polyamide resin, and 1 to 150 parts by weight of (B) reinforcing filler having a refractive index at 23° C. of 1.560 to 1.600, wherein at least one monomer that composes at least one kind of the (A) polyamide resin has an aromatic ring.

CITATION LIST

Patent Literature

[Patent Literature 1] JP 2008-308526 A

SUMMARY OF THE INVENTION

Technical Problem

Now, the resin composition described in Patent Literature 1, although being an excellent resin composition, still leaves room for further improvement, considering applications where low warpage is required. The warpage is usually attributable to glass fiber contained in the resin composition, particularly to glass fiber having circular cross section. Complete exclusion of the glass fiber from the resin composition will, however, degrade the mechanical strength. A possible way to keep a necessary level of mechanical strength while reducing the warpage might be replacement of a part of the glass fiber with other filler. Addition of such other filler was, however, found to occasionally degrade the transmittance.

This invention is aimed at solving these problems, and an object of which is to provide a resin composition that contains a glass fiber, but having reduced warpage and high transmittance; as well as a formed article, a kit, and a method for manufacturing a formed article using the same.

Solution to Problem

The present inventors conducted diligent research to address the above-mentioned problems, and as a result, discovered that the above problems could be solved with use of the glass fiber and muscovite as the filler. Specifically, the problems described above are solved by the following means <1>, and preferably by the following means <2> to <14>.

<1> A polyamide resin composition comprising a polyamide resin, a glass fiber, a light-transmitting dye, and muscovite.

<2> The resin composition of <1>, demonstrating a light transmittance of 30% or larger, when given in the form of a 1 mm thick formed article and measured at a wavelength of 1070 nm in compliance with ISO 13468-2.

<3> The resin composition of <1> or <2>, wherein the polyamide resin comprises a diamine-derived structural unit and a dicarboxylic acid-derived structural unit, 70 mol % or more of the diamine-derived structural unit is derived from xylylenediamine, and 70 mol % or more of the dicarboxylic acid-derived structural unit is derived from straight chain $\alpha,\omega$-dicarboxylic acid having 4 to 20 carbon atoms, and 60 mol % or more of the xylylenediamine-derived structural unit is a metaxylylenediamine-derive structural unit.

<4> The resin composition of any one of <1> to <3>, demonstrating a warpage of 1 mm or smaller when given in the form of a 60 mm×60 mm×1 mm thick formed article, where the warpage is difference of height between the highest point and lowest point of the specimen placed on a reference stage.

<5> The resin composition of any one of <1> to <4>, wherein the polyamide resin contains a polyamide resin that demonstrates a half-crystallization time of 10 to 60 seconds and a melting point of 200 to 280° C.; where the half-crystallization time is measured by a depolarized light intensity method under conditions involving a temperature 20° C. higher than the melting point of the polyamide resin, a melting time of polyamide resin of 5 minutes, and a crystallization bath temperature of 150° C.

<6> The resin composition of any one of <1> to <5>, where the glass fiber has a circular cross section.
<7> The resin composition of any one of <1> to <6>, wherein content ratio of the glass fiber in the composition is 15 to 35% by mass.
<8> The resin composition of any one of <1> to <7>, wherein content ratio of muscovite in the composition is 5 to 40% by mass.
<9> The resin composition of any one of <1> to <7>, wherein content ratio of muscovite in the composition is 20 to 40% by mass.
<10> The resin composition of any one of <1> to <9>, wherein in the glass fiber and muscovite follows a mass ratio of 1:0.3 to 2.0.
<11> The resin composition of any one of <1> to <9>, wherein the glass fiber and muscovite follows a mass ratio of 1:1.0 to 2.0.
<12> A formed article formed of the resin composition described in any one of <1> to <11>.
<13> A kit comprising the resin composition described in any one of <1> to <11>; and a light-absorbing resin composition that contains a thermoplastic resin and a light-absorbing dye.
<14> A method for manufacturing a formed article comprising laser-welding a formed article formed of the resin composition described in any one of <1> to <11>, and a formed article formed of a light-absorbing resin composition that contains a thermoplastic resin and a light-absorbing dye.

Advantageous Effects of Invention

This invention enabled provision of a resin composition that contains a glass fiber, but having reduced warpage and high transmittance; as well as a formed article, a kit, and a method for manufacturing a formed article using the same.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

The polyamide resin composition of this invention contains a polyamide resin, a glass fiber, a light-transmitting dye, and muscovite.

With muscovite contained therein together with the glass fiber, the formed article will be effectively suppressed from warping even having the glass fiber blended therein. That is, by adding a filler other than the glass fiber, it becomes possible to keep a necessary level of mechanical strength while relatively reducing ratio of the glass fiber. Although blending of other filler, besides the glass fiber, has occasionally degraded the transmittance, present inventors found that high transmittance is attainable with use of muscovite, and has completed this invention.

<Polyamide Resin>

The polyamide resin composition of this invention contains a polyamide resin.

The polyamide resin may be aliphatic polyamide resin or semiaromatic polyamide resin.

The aliphatic polyamide resin is exemplified by polyamide 6, polyamide 66, polyamide 11 and polyamide 12. Polyamide 66 is preferred.

The semiaromatic polyamide resin is exemplified by polyamide 6T, polyamide 9T, polyamide 10T, polyamide 6I, polyamide 9I, polyamide 6T/6I, polyamide 9T/9I, and xylylenediamine-based polyamide resin.

One embodiment of the polyamide resin used in this invention is the xylylenediamine-based polyamide resin.

The xylylenediamine-based polyamide resin means a polyamide resin which contains a diamine-derived structural unit and a dicarboxylic acid-derived structural unit, in which 70 mol % or more of the diamine-derived structural unit is derived from xylylenediamine.

In the xylylenediamine-based polyamide resin used in this invention, preferably 80 mol % or more of the diamine-derived structural unit is derived from xylylenediamine, and the percentage is more preferably 90 mol % or larger, even more preferably 95 mol % or larger, and yet more preferably 99 mol % or larger.

The xylylenediamine-derived structural unit is preferably metaxylylenediamine-derived structural unit and/or paraxylylenediamine-derived structural unit, wherein more preferably 60 mol % or more of the xylylenediamine-derived structural unit is metaxylylenediamine-derived structural unit.

Diamine other than xylylenediamine, employable as a raw diamine component for the xylylenediamine-based polyamide resin, is exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; aromatic ring-containing diamines such as bis(4-aminophenyl)ether, paraphenylenediamine, and bis(aminomethyl)naphthalene, all of which may be used singly, or in combination of two or more kinds thereof.

In the xylylenediamine-based polyamide resin used in this invention, preferably 75 mol % or more of the dicarboxylic acid-derived structural unit is derived from a straight chain $\alpha,\omega$-dicarboxylic acid having 4 to 20 carbon atoms, the percentage is more preferably 85 mol % or larger, even more preferably 95 mol % or larger, and even more preferably 99 mol % or larger.

The straight chain $\alpha,\omega$-dicarboxylic acid having 4 to 20 carbon atoms is preferably a straight chain $\alpha,\omega$-dicarboxylic acid having 4 to 12 carbon atoms, and more preferably a straight chain $\alpha,\omega$-dicarboxylic acid having 6 to 12 carbon atoms.

The straight chain $\alpha,\omega$-dicarboxylic acid having 4 to 20 carbon atoms is exemplified by aliphatic dicarboxylic acids such as succinic acid, glutaric acid, pimelic acid, suberic acid, azelaic acid, adipic acid, sebacic acid, undecanedioic acid, and dodecanedioic acid. Adipic acid and/or sebacic acid are further preferred. The straight chain $\alpha,\omega$-dicarboxylic acid having 4 to 20 carbon atoms may be used singly, or in combination of two or more kinds thereof.

Dicarboxylic acid component other than the straight chain $\alpha,\omega$-dicarboxylic acid having 4 to 20 carbon atoms is exemplified by phthalic acid compounds such as isophthalic acid, terephthalic acid and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, all of which may be used singly, or in combination of two or more kinds thereof.

In particular, the xylylenediamine-based polyamide resin is preferably a polyamide resin in which 70 mol % or more of the diamine-derived structural unit is derived from xylylenediamine, 70 mol % or more of the dicarboxylic acid-derived structural unit is derived from the straight chain $\alpha,\omega$-dicarboxylic acid having 4 to 20 carbon atoms, and 60 mol % or more of the xylylenediamine-derived structural unit is a metaxylylenediamine-derived structural unit.

A preferred first embodiment of the xylylenediamine-based polyamide resin relates to a polyamide resin in which 70 mol % or more of the diamine-derived structural unit is derived from xylylenediamine, 70 mol % or more (preferably 80 mol % or more, and more preferably 90 mol % or more) of the dicarboxylic acid-derived structural unit is derived from adipic acid, and 60 mol % or more (preferably 80 mol % or more, and more preferably 90 mol % or more) of the xylylenediamine-derived structural unit is a metaxylylenediamine-derived structural unit.

A preferred second embodiment of the xylylenediamine-based polyamide resin relates to a polyamide resin in which 70 mol % or more (preferably 80 mol % or more, and more preferably 90 mol % or more) of the diamine-derived structural unit is derived from xylylenediamine, 70 mol % or more (preferably 80 mol % or more, and more preferably 90 mol % or more) of the dicarboxylic acid-derived structural unit is derived from sebacic acid, 60 to 90 mol % of the xylylenediamine-derived structural unit is a metaxylylenediamine-derived structural unit, and 40 to 10 mol % thereof is a paraxylylenediamine-derived structural unit.

The xylylenediamine-based polyamide resin, although having the diamine-derived structural unit and the dicarboxylic acid-derived structural unit as the major components, does not completely exclude the structural unit other than them, and may of course contain structural units derived from lactams such as ε-caprolactam or laurolactam; or from aliphatic aminocarboxylic acid such as aminocaproic acid and aminoundecanoic acid. Now the major components mean that the total of the diamine-derived structural unit and the dicarboxylic acid-derived structural unit accounts for the largest percentage, from among the structural units that compose the xylylenediamine-based polyamide resin. In this invention, the total of the diamine-derived structural unit and the dicarboxylic acid-derived structural unit in the xylylenediamine-based polyamide resin preferably accounts for 90% or more of the whole structural units, which is more preferably 95% or more.

The polyamide resin used in this invention has a half-crystallization time whose lower limit value is preferably 10 seconds or longer, more preferably 20 seconds or longer, even more preferably 25 seconds or longer, and yet more preferably 30 seconds or longer. The upper limit value of the half-crystallization time is independently 60 seconds or below, preferably 55 seconds or below, more preferably 50 seconds or below, and even more preferably 45 seconds or below. With use of the polyamide resin having such half-crystallization time, weld strength of the interface between the transmitting resin member and the absorbing resin member in laser welding may be improved.

The polyamide resin used in this invention preferably has a melting point of 200 to 280° C. With the melting point chosen at or below the upper limit value, obtainable advantages are such that injection molding will become relatively easier, and that low output in laser welding will suffice. On the other hand, with the melting point chosen at or above the lower limit value, the heat resistance will tend to improve. The lower limit of the melting point is preferably 205° C. or above, and more preferably 210° C. or above. The upper limit of the melting point is preferably 275° C. or below, more preferably 270° C. or below, and even more preferably 265° C. or below.

The melting point is measured as a temperature where an endothermic peak observed in the process of heating by DSC (differential scanning calorimetry) hits the bottom. Measurement is conducted by using a differential scanning calorimeter, with 1 mg of sample, under conditions that involve a flow rate of 30 mL/min of nitrogen gas as an atmospheric gas, and a heating rate of 10° C./min, by which the sample is heated from room temperature up to a temperature equal to or above a predicted melting point and allowed to melt. The melting point is determined on the basis of a temperature where the observed endothermic peak hits the bottom.

For the resin composition used in this invention containing two or more kinds of polyamide resin, the melting point of the polyamide resin is represented by that of the most abundant polyamide resin. For a polyamide resin having two or more melting points, the melting point of the polyamide resin is represented by the lowest melting point.

In this invention, difference of melting point, between the polyamide resin contained in the transmitting resin member and the polyamide resin contained in the absorbing resin member, is preferably 50° C. or smaller, more preferably 30° C. or smaller, even more preferably 20° C. or smaller, yet more preferably 10° C. or smaller, and furthermore preferably 5° C. or smaller. Within these ranges, an interfacial gap between the transmitting resin member and the absorbing resin member during laser welding may be further reduced. The difference of the melting points is most preferably 0° C.

In the polyamide resin composition of this invention, the ratio of content of the polyamide resin in the resin composition is preferably 25% by mass or larger, more preferably 30% by mass or larger, and more preferably 35% by mass or larger. The upper limit value of the polyamide resin content is preferably 70% by mass or below, more preferably 65% by mass or below, even more preferably 60% by mass or below, yet more preferably 55% by mass or below, and may even be 50% by mass or below, and 47% by mass or below.

Only one kind of polyamide resin may be contained, or two or more kinds of polyamide resins may be contained. When two or more kinds thereof are contained, the total content preferably falls within the aforementioned ranges.

<Glass Fiber>

The polyamide resin composition of this invention contains a glass fiber. With the glass fiber contained therein, the obtainable formed article will have high mechanical strength.

The glass fiber has a composition of A-glass, C-glass, E-glass, S-glass, M-glass or the like. E-glass (non-alkali glass) is particularly preferred.

The glass fiber means an article having a true circular or polygonal cross section when viewed perpendicularly to the longitudinal direction, and having a fiber-like appearance.

The glass fiber used for the polyamide resin composition of this invention may be a single yarn, or may be a twisted yarn made of a plurality of single yarns.

Product form of the glass fiber may be any of "glass roving" which is a roll on which a single yarn or twisted yarn made of a plurality of single yarns is continuously wound, "chopped strand" cut into 1 to 10 mm length, and "milled fiber" ground into 10 to 500 µm length. These sorts of glass fiber are marketed with the trade names of "Glasron Chopped Strand" and "Glasron Milled Fiber" from Asahi Fiber Glass Co., Ltd., which are readily available. Glass fibers with different morphologies may be used in a combined manner.

The glass fiber used in this invention has a cross section which may be circular or non-circular. With use of the glass fiber having a non-circular cross section, the obtainable formed article will be effectively suppressed from warping. In this invention, even use of the glass fiber having a circular cross section can effectively suppress the warpage.

Content of the glass fiber in the polyamide resin composition of this invention is preferably 15% by mass or more of the polyamide resin composition, more preferably 20% by mass or more, and even more preferably 23% by mass or more. The upper limit value is preferably 35% by mass or below, more preferably 30% by mass or below, and even more preferably 28% by mass or below.

The polyamide resin composition of this invention may contain only one kind of glass fiber, or two or more kinds thereof. When two or more kinds thereof are contained, the total content falls within the aforementioned ranges. Note that the content of glass fiber in this invention is practically understood to involve amounts of sizing agent and surface modifier.

<Muscovite>

The polyamide resin composition of this invention contains muscovite. With muscovite blended therein, the resin composition can achieve high light transmittance, while allowing the inorganic filler to demonstrate its function.

Muscovite is typically represented by an ideal formula of $KAl_2AlSi_3O_{10}(OH)_2$. Since typically being a naturally-occurred ore, muscovite may contain a component other than those in the formula. Such other component is exemplified by Mg component, P component, S component, Cl component, Ca component, Ti component, Cr component, Mn component, Fe component, Ni component, Rb component, Sr component and Ba component. These components are contained so as to substitute a part of $KAl_2AlSi_3O_{10}(OH)_2$, or intercalated. In this invention, $KAl_2AlSi_3O_{10}(OH)_2$ preferably accounts for 50% by mass or more of muscovite.

Note that muscovite in this invention is understood to encompass sericite and fuchsite.

Muscovite used in this invention preferably has a particle size of 10 µm or larger, which is more preferably 15 µm or larger. The upper limit value of the particle size is preferably 300 µm or below, which is more preferably 250 µm or below. The particle size is measured according to a method described in JIS Z8825 "Particle Size Analysis—Laser Diffraction Methods".

Muscovite used in this invention preferably has an aspect ratio of 20 or larger, which is more preferably 40 or larger, and even more preferably 60 or larger. The upper limit value of the aspect ratio is preferably 300 or below, more preferably 200 or below, and even more preferably 150 or below. The aspect ratio is measured according to the methods described in JIS 28103, JIS 28901 and JIS 28900.

Muscovite used in this invention is exemplified by B-72 from Yamaguchi Mica Co., Ltd, and Micalet A-21B from Yamaguchi Mica Co., Ltd.

Content of muscovite in the polyamide resin composition of this invention is preferably 5% by mass or more of the polyamide resin composition, more preferably 8% by mass or more, even more preferably 12% by mass or more, yet more preferably 20% by mass or more, and even may be 25% by mass or more, and 28% by mass or more. The upper limit value is preferably 40% by mass or below, more preferably 35% by mass or below, and even more preferably 33% by mass or below.

The polyamide resin composition of this invention may contain only one kind of muscovite, or may contain two or more kinds thereof. When two or more kinds thereof are contained, the total content falls within the aforementioned ranges.

In the polyamide resin composition of this invention, mass ratio of the glass fiber and muscovite is preferably 1:0.3 to 2.0 more preferably 1:0.5 to 2.0, even more preferably 1:1.0 to 2.0, yet more preferably larger than 1:1.0 and 1.5 or smaller, and furthermore preferably 1:1.1 to 1.4. Within these ranges, the mechanical strength and the light transmittance may be effectively and suitably balanced.

In the polyamide resin composition of this invention, the total of the polyamide resin, the glass fiber, muscovite and the light-transmitting dye preferably accounts for 84% by mass or more of the composition, which is more preferably 89% by mass or more, even more preferably 94% by mass or more, and yet more preferably 96% by mass or more.

<Other Fillers>

The polyamide resin composition of this invention may contain a filler other than the glass fiber and muscovite, without departing from the spirit of this invention. Such other fillers are exemplified by carbon fiber, wollastonite, potassium titanate whisker, calcium carbonate whisker, aluminum borate whisker, magnesium sulfate whisker, sepiolite, zonolite, and zinc oxide whisker.

Alternatively, the polyamide resin composition of this invention may contain substantially no other filler. Now, " . . . contain substantially no . . . " means that the total of such other fillers accounts for 10% by mass or less of the total content of the glass fiber and muscovite, which is preferably 5% by mass or less, more preferably 3% by mass or less, and even may be 1% by mass or less.

<Light-Transmitting Dye>

The light-transmitting dye used in this invention is typically black dye, and is specifically exemplified by nigrosine, naphthalocyanine, aniline black, phthalocyanine, porphyrin, perinone, quaterrylene, azo dye, anthraquinone, pyrazolone, squaric acid derivative, perylene, chromium complex, and immonium dye. Now, the light-transmitting dye means a dye typically capable of allowing the resin composition to demonstrate a transmittance of 30% or larger, when 0.2% by mass of such dye (supposed to be a light-transmitting dye) is blended with the polyamide resin and 30% by mass of glass fiber to adjust the total to 100% by mass, and then subjected to measurement of light transmittance at a wavelength of 1070 nm, according to a method of measurement described later in EXAMPLES.

Commercially available products are exemplified by colorants e-BIND LTW-8731H and e-BIND LTW-8701H, from Orient Chemical Industries Co., Ltd.; colorants Plast Yellow 8000, Plast Red M 8315 and Oil Green 5602, from Arimoto Chemical Co., Ltd.; and colorants Macrolex Yellow 3G, Macrolex Red EG and Macrolex Green 3, from LANXESS GmbH.

In particular, by using a polyamide resin composition that contains, as the light-transmitting dye, at least one of perylene, chromium complex, pyrazolone, perinone or anthraquinone, the obtainable formed article will be effectively suppressed from causing color transfer after wet heat test.

Content of the light-transmitting dye in the polyamide resin composition of this invention, per 100 parts by mass of the resin composition, is preferably 0.001 parts by mass or more, more preferably 0.006 parts by mass or more, even more preferably 0.018 parts by mass or more, and even may be 0.024 parts by mass or more, 0.030 parts by mass or more, and 0.050 parts by mass or more. The upper limit value of the content of light-transmitting dye, per 100 parts by mass of the resin composition, is preferably 5.0 parts by mass or below, more preferably 3.0 parts by mass or below, even more preferably 1.0 parts by mass or below, and even may be 0.30 parts by mass or below, 0.10 parts by mass or below, and 0.060 parts by mass or below.

The light-transmitting dye may be contained singly, or in combination of two or more kinds thereof. When two or more kinds thereof are contained, the total content falls within the aforementioned ranges.

The polyamide resin composition of this invention preferably contains substantially no carbon black. Now, " . . . contains substantially no . . . " typically means that the carbon black accounts for 0.0001% by mass or less of the resin composition.

<Mold Releasing Agent and Lubricant>

The polyamide resin composition of this invention may contain a mold releasing agent and/or a lubricant.

The mold releasing agent and/or the lubricant are exemplified by aliphatic carboxylic acid, salt of aliphatic carboxylic acid, ester of aliphatic carboxylic acid and alcohol, aliphatic carboxylic acid amide, aliphatic hydrocarbon having a number-average molecular weight of 200 to 15,000, and polysiloxane-based silicone oil.

For details of the mold releasing agent and/or the lubricant, descriptions in paragraphs [0034] to [0039] of JP 2017-115093 A may be referred to, the contents of which are incorporated by reference into this patent specification.

Total contents of the mold releasing agent and/or the lubricant, when contained in the polyamide resin composition of this invention, is preferably 0.05 to 5 parts by mass per 100 parts by weight of the polyamide resin, which is more preferably 0.1 to 4 parts by mass, and even more preferably 0.2 to 3 parts by mass.

The polyamide resin composition of this invention may contain only one kind of the mold releasing agent and/or the lubricant, or may contain two or more kinds thereof. When two or more kinds thereof are contained, the total content preferably falls within the aforementioned ranges.

<Nucleating Agent>

The polyamide resin composition of this invention may contain a nucleating agent for the purpose of controlling crystallization speed. The nucleating agent may be of any type without special limitation, and is preferably talc, boron nitride, mica, kaolin, calcium carbonate, barium sulfate, silicon nitride, potassium titanate or molybdenum bisulfate, more preferably talc and boron nitride, and even more preferably talc.

Note that the nucleating agent is a granular matter, and is discriminable from the aforementioned inorganic filler by those skilled in the art.

Content of the nucleating agent, when contained in the polyamide resin composition of this invention, is preferably 0.01 to 10 parts by mass, per 100 parts by mass of the polyamide resin, more preferably 0.1 to 8 parts by mass, and even more preferably 0.1 to 6 parts by mass.

The polyamide resin composition of this invention may contain only one kind of nucleating agent, or two or more kinds thereof. When two or more kinds thereof are contained, the total content falls within the aforementioned ranges.

<Other Components>

The polyamide resin composition of this invention may contain other components without departing from the spirit of this invention. Such other components are exemplified by light stabilizer, antioxidant, flame retarder, flame retardant auxiliary, UV absorber, fluorescent brightener, anti-dripping agent, antistatic agent, anti-clouding agent, anti-blocking agent, flow modifier, plasticizer, dispersion aid and antibacterial agent. These components may be used singly, or in combination of two or more kinds thereof.

Note that, in the polyamide resin composition of this invention, contents of the resin component, glass fiber, light-transmitting dye, muscovite, and optional other components are controlled so that the individual components are added up to 100% by mass.

<Properties of Resin Composition>

The polyamide resin composition of this invention preferably demonstrates a light transmittance of 30% or larger, when given in the form of a 1 mm thick formed article and measured at a wavelength of 1070 nm in compliance with ISO 13468-2, which may be further elevated to 40% or larger, and 50% or larger. Although the upper limit value is not specifically limited, a transmittance of 80% or below, or even 75% or below, is enough to satisfy the practical performance.

The light transmittance is measured by a method described later in EXAMPLES.

The polyamide resin composition of this invention preferably demonstrates a warpage of 1 mm or smaller when given in the form of a 60 mm×60 mm×1 mm thick formed article, the warpage is more preferably 0.8 mm or smaller, even more preferably 0.7 mm or smaller, and further may be 0.5 mm or smaller. The lower limit value, although ideally 0 mm, may typically be 0.1 mm or above, wherein practical performance may be satisfied even at 0.2 mm or above.

The warpage may be measured by a method described later in EXAMPLES.

<Method for Manufacturing Resin Composition>

The method for manufacturing the polyamide resin composition of this invention is preferably, but not restrictively, a method of using a single-screw or twin-screw extruder equipped with a unit capable of devolatalizing through a vent port. The polyamide resin component, the glass fiber, the light-transmitting dye, muscovite and other optional additive may be fed collectively to the extruder, or the polyamide resin component may be sequentially fed with the other components to be blended. The glass fiber and muscovite are preferably side-fed so as not to be crushed during kneading. Alternatively, two or more kinds of the components chosen from among the individual components may be preliminarily mixed and kneaded.

In this invention, the light-transmitting dye is preliminarily mixed with a polyamide resin or the like to prepare a masterbatch, and the masterbatch may be further kneaded with the other components (polyamide resin, glass fiber, light-transmitting dye, muscovite, etc.) to obtain the resin composition of this invention.

The method for manufacturing a formed article with use of the polyamide resin composition of this invention is not specifically limited, to which any of known forming methods applied to thermoplastic resin are applicable, from among injection molding, hollow molding, extrusion molding, press forming and so forth. Particularly preferred forming method in this case is injection molding, considering the good fluidity. Resin temperature in injection molding is preferably controlled at 250 to 300° C.

<Kit>

The polyamide resin composition of this invention, and a light-absorbing resin composition that contains a thermoplastic resin and a light-absorbing dye, are suitably combined in a kit for manufacturing a formed article by laser welding.

That is, the polyamide resin composition of this invention contained in the kit serves as the light-transmitting resin composition, and a formed article formed of such light-transmitting resin composition becomes a transmitting resin member through which laser light can transmit during laser welding. On the other hand, a formed article foitned of the light-absorbing resin composition serves as the absorbing resin member that absorbs laser light during laser welding.

<<Light-Absorbing Resin Composition>>

The light-absorbing resin composition used in this invention contains the thermoplastic resin and the light-absorbing dye, and may further contain an inorganic filler.

The thermoplastic resin is exemplified by polyamide resin, olefinic resin, vinyl-based resin, styrene-based resin, acrylic resin, polyphenylene ether resin, polyester resin, polycarbonate resin, and polyacetal resin. Among them, polyamide resin, polyester resin and polycarbonate resin are particularly preferred considering their good compatibility with the light-transmitting resin composition (the resin composition of this invention), and polyamide resin is further preferred. The thermoplastic resin may be used singly, or in combination of two or more kinds thereof.

The polyamide resin used for the light-absorbing resin composition is preferably the aforementioned xylylenediamine-based polyamide resin, although the types and so forth are not specifically limited.

The inorganic filler is exemplified by fillers that can absorb laser light, such as glass fiber, carbon fiber, silica, alumina, talc, carbon black, and inorganic powder coated with laser-absorbing material, among which glass fiber is preferred. The glass fiber is the same matter as those that can be used for the polyamide resin composition of this invention. Content of the glass fiber is preferably 20 to 70% by mass, more preferably 25 to 60% by mass, and even more preferably 30 to 55% by mass.

The light-absorbing dye means a dye having a maximum absorption wavelength within the wavelength range of laser light to be irradiated, which is 800 nm to 1100 nm in this invention, and typically means a dye that demonstrates a transmittance of smaller than 30%, and further 10% or smaller, when 0.3 parts by mass thereof is added to 100 parts by mass of the polyamide resin, and when the light transmittance is measured according to a method described later in EXAMPLES.

The light-absorbing dye is specifically exemplified by inoragnic pigments [black pigments such as carbon black (acetylene black, lamp black, thermal black, furnace black, channel black, Ketjenblack, etc.), red pigment such as red iron oxide, orange pigment such as molybdate orange, white pigment such as titanium oxide]; and organic pigments (yellow pigment, orange pigment, red pigment, blue pigment, green pigment, etc.). Among them, the inorganic pigments are preferred for their high concealability as a whole, and black pigment is further preferred. These light-absorbing dyes may be used in combination of two or more kinds thereof. Content of the light-absorbing dye is preferably 0.01 to 30 parts by mass, per 100 parts by mass of the resin component.

The kit preferably has 80% by mass or more of the components in the polyamide resin composition, but excluding the light-transmitting dye and the inorganic filler (glass fiber, muscovite, etc.), and the components in the light-absorbing resin, but excluding the light-absorbing dye and the inorganic filler, in common, more preferably has 90% by mass or more thereof in common, and even more preferably has 95 to 100% by mass thereof in common.

<<Laser Welding Method>>

Next, the laser welding method will be explained. In this invention, a formed article may be manufactured by laser-welding the formed article (transmitting resin member) formed of the polyamide resin composition of this invention, and the formed article (absorbing resin member) formed of the light-absorbing resin composition. By employing laser welding, the transmitting resin member and the absorbing resin member may be tightly welded without using an adhesive.

Shape of the members, although not specifically limited, usually has at least a site allowed for surface contact (flat face or curved face), since the members are used in a bonded form after laser welding. In laser welding, light transmitted through the transmitting resin member is absorbed by the absorbing resin member, thereby causing melting, and welding of both members. Since the formed article formed of the polyamide resin composition of this invention has high transmittance of laser light, and is therefore suitably used as the transmitting resin member. Thickness of the member through which laser light transmits (thickness of a part through which laser light transmits, when measured in the direction of transmission of laser light) is suitably determined, considering application, chemical composition of the resin composition and so forth, which is typically 5 mm or smaller, and preferably 4 mm or smaller.

A laser light source used for laser welding may be determined depending on absorption wavelength of the light-absorbing dye, for which laser within the wavelength range of 800 to 1100 nm is preferred, to which semiconductor laser or fiber laser is applicable.

More specifically, in an exemplary case where the transmitting resin member and the absorbing resin member are welded, first, the welding sites of both members are brought into contact. The welding sites at this time are preferably kept in surface contact between flat faces, curved faces, or combination of flat and curved faces. Next, the laser light is irradiated through the transmitting resin member. The laser light at this time may be condensed through an optional lens on the interface between both members. The condensed beam transmits through the transmitting resin member, absorbed at around the surface of the absorbing resin member, generates heat, and melts the resin. The heat is then transmitted by thermal conduction also to the transmitting resin member to form a molten pool at the interface between both members, which are bonded after cooled.

The formed article, composed of the transmitting resin member and the absorbing resin member thus welded, has high weld strength. Note that the formed article in the context of this invention also encompasses not only finished product or parts, but also members that compose a part of them.

The formed article obtained by laser welding in this invention excels in mechanical strength and weld strength, and causes less damage on the resin, and is therefore applicable to various purposes, such as a variety of storage containers, electrical/electronic equipment, office automation (OA) equipment, home electric appliances, machine and mechanism parts, and vehicle mechanism parts. In particular, the formed article is suitable for food container, drug container, oil and fat products container, vehicle hollow parts (various tanks, intake manifold part, camera enclosure, etc.), vehicle electrical parts (various control units, ignition coil part, etc.), motor part, various sensor parts, connector part, switch part, breaker part, relay part, coil part, transformer part and lamp part, and so forth. The polyamide resin composition and the kit of this invention are particularly suitable for car-borne camera module.

EXAMPLES

This invention will further be detailed referring to Examples. Materials, amounts of consumption, ratios, process details, process procedures and so forth described in Examples below may suitably be modified without departing from the spirit of this invention. The scope of this invention is therefore not limited to the specific Examples below.

<Polyamide Resin>
MXD6: polymetaxylylene adipamide, from Mitsubishi Gas Chemical Company, Inc., MX Nylon #6000, half-crystallization time=45 seconds, melting point=237° C.
MP10: M/P=7:3, synthesized according to Exemplary Synthesis below, half-crystallization time=30 seconds, melting point=215° C.
PA66: CM3001-N from Toray Industries, Inc., half-crystallization time=3 seconds, melting point=260° C.

<Glass Fiber>
T-275H: glass fiber with circular cross section, number-average fiber diameter=10.5±1.0 μm, E-glass ($SiO_2$/$Al_2O_3$/CaO/MgO/$B_2O_3$/$Na_2O$/$K_2O$), from Nippon Electric Glass Co., Ltd.
T-289DE: glass fiber with circular cross section, number-average fiber diameter=6 μm, E-glass ($SiO_2$/$Al_2O_3$/CaO/MgO/$B_2O_3$/$Na_2O$/$K_2O$) from Nippon Electric Glass Co., Ltd.

<Inorganic Filler (Muscovite or Substitute Thereof)>
B-82: muscovite (ideal formula: $KAl_2AlSi_3O_{10}(OH)_2$), particle size=180 μm, aspect ratio=100, from Yamaguchi Mica Co., Ltd.
Micalet: muscovite (ideal formula: $KAl_2AlSi_3O_{10}(OH)_2$), particle size=23 μm, aspect ratio=70, A-21B, from Yamaguchi Mica Co., Ltd.
325-HK: phlogopite (ideal formula: $K_2(Mg,Fe)_6Si_6O_2O(OH)_4$), particle size=25 μm, aspect ratio=80, Suzorite, from Imerys Specialities Japan Co., Ltd.
200-HK: phlogopite (ideal formula: $K_2(Mg,Fe)_6Si_6O_{20}(OH)_4$), particle size=60 μm, aspect ratio=55, Suzorite Model: 200-HK, from Imerys Specialities Japan Co., Ltd.,
150-s: phlogopite (ideal formula: $K_2(Mg,Fe)_6Si_6O_{20}(OH)_4$), particle size=150 μm, aspect ratio=90, Suzorire Model: 150-s, from Imerys Specialities Japan Co., Ltd.,
TISMO D-101: potassium titanate whisker (ideal formula: $K_2Ti_8O_{17}$, $K_2Ti_6O_{13}$), D-101, from Otsuka Chemical Co., Ltd.
NYGLOS 8 10113: wollastonite, number-average fiber length=136 μm, number-average fiber diameter=8 μm, aspect ratio=17, NYGLOS 8, from Imerys S.A.
NYGLOS 4W 10112: wollastonite, number-average fiber length=50 μm, number-average fiber diameter=4.5 μm, aspect ratio=11, NYGLOS 4W, from Imerys S.A., <LTW Dye (Light-Transmitting Dye)>
LTW-8731H: e-BIND LTW-8731H, from Orient Chemical Industries Co., Ltd., masterbatch of polyamide 66 and light-transmitting dye
LTW-8701H: e-BIND LTW-8701H, from Orient Chemical Industries Co., Ltd., masterbatch of polyamide 66 and light-transmitting dye
Orasol X45: chromium complex, from BASF Colors & Effects Japan Ltd.
Lumogen K0088: perylene pigment, from BASF Colors & Effects Japan Ltd.

<Mold Releasing Agent and Lubricant>
CS8CP: calcium montanate, from Sakai Chemical Industry Co., Ltd.
T-1: Kaowax T-1, ketone wax, from KAO Corporation <Nucleating Agent>
Talc MS: talc, from Nippon Talc Co., Ltd.
5000S: talc, from Hayashi Kasei Co., Ltd., Micron White 5000S <Exemplary Synthesis of MP10 (M/P=7:3)>
Sebacic acid was dissolved under heating in a reaction can with a nitrogen atmosphere, the content was kept stirred, to which a mixed diamine that contains paraxylylenediamine (from Mitsubishi Gas Chemical Company, Inc.) and metaxylylenediamine (from Mitsubishi Gas Chemical Company, Inc.) with a molar ratio of 3:7 was gradually added dropwise under pressure (0.35 MPa), so as to adjust the molar ratio of diamine and sebacic acid to approximately 1:1, while elevating the temperature up to 235° C. After completion of the dropwise addition, the reaction was allowed to proceed for 60 minutes so as to control content of fraction having a molecular weight of 1,000 or smaller. Upon completion of the reaction, the content was taken out in the form of strands, pelletized by using a pelletizer, to obtain a polyamide resin (MP10, M/P=7:3).

Examples and Comparative Examples

<Compound>
Pellets for forming the light-transmitting member listed in Tables 1 to 4 described later (polyamide resin compositions) were manufactured.

More specifically, the individual components listed in Tables 1 to 4 described below, but excluding the glass fiber and the inorganic filler, were weighed according to the ratios (in parts by mass) listed in Table 1 to 4, dry-blended, and fed from the base of screws of a twin-screw extruder (TEM26SS, from Toshiba Machine Co., Ltd.) by using a twin-screw cassette weighing feeder (CE-W-1-MP, from Kubota Corporation). The glass fiber and the inorganic filler were fed by using a vibrating cassette weighing feeder (CE-V-1B-MP, from Kubota Corporation), from the lateral side of the aforementioned twin-screw extruder, then melt-kneaded with the resin component and so forth, to thereby obtain the pellets (resin composition) for forming the light-transmitting member.

Each of the thus obtained pellets for forming the light-transmitting member was dried at 120° C. for 4 hours, and then formed to produce a specimen for light-transmitting member (60 mm×60 mm×1.0 mm thick), by using an injection molding machine (SE-50D, from Sumitomo Heavy Industries, Ltd.).

During the forming, the cylinder temperature was set to 280° C., and the die temperature was set corresponding to the types of polyamide resin employed as the major component of the resin components, for example to 130° C. (MXD6), 110° C. (MP10), and 80° C. (PA66).

<Light Transmittance>

Each of the thus obtained specimens for the light-transmitting member was subjected to measurement of light transmittance (in 1) at a wavelength of 1070 nm, in compliance with ISO 13468-2. Results are summarized in Tables 1 to 4.

<Warpage>

Figure 1:
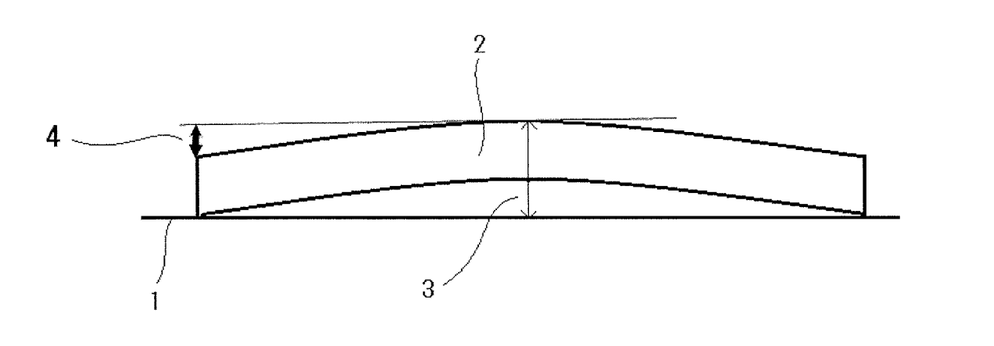
FIG. 1 is a schematic drawing explaining a method of measuring height of warpage in Examples.

Each of the thus obtained specimen for the light-transmitting member (60 mm×60 mm×1.0 mm thick) was placed on a reference stage, the height at the highest point of the specimen (Max height, in mm) and the height at the lowest point of the specimen (Min height, in mm) were individually measured by using a three-dimensional shape profiler, and the difference was determined. More specifically, as illustrated in FIG. 1, height of a reference stage 1 was assumed to 0 mm, and from among heights of a specimen for the light-transmitting member 2 placed thereon, the height at the highest point 3 and the height at the lowest point (normally at the end of specimen) were measured, and difference in between was determined as a warpage 4.

The three-dimensional shape profiler used here was VR-3000/3200, from Keyence Corporation. Results are summarized in Tables 1 to 4.

TABLE 1

| Composition | | | Example 1 | Example 2 | Example 3 | Example 4 | Comparative Example 1 | Comparative Example 2 |
|---|---|---|---|---|---|---|---|---|
| Polyamide resin | 6000 | MXD6 | 40 | 40 | | | 40 | 40 |
| | Synthetic product | MP10 | | | 43 | | | |
| | CM3001-N | PA66 | 3 | 3 | | 43 | 3 | 3 |
| Glass fiber | T-275H | Glass fiber | 25 | 25 | 25 | 25 | 25 | 25 |
| | T-289DE | Glass fiber | | | | | | |
| Inorganic filler | B-82 | Muscovite | 30 | | 30 | 30 | | |
| | Micalet A-21B | Muscovite | | 30 | | | | |
| | 325HK | Phlogopite | | | | | 30 | |
| | 200HK | Phlogopite | | | | | | 30 |
| | 150-s | Phlogopite | | | | | | |
| | TISMO D-101 | Potassium titanate whisker | | | | | | |
| | NYGLOS 8 1011.3 | Wollastonite | | | | | | |
| | NYGLOS 4W 10112 | Wollastonite | | | | | | |
| LTW dye | LTW-8731H | Dye | 2 | 2 | 2 | 2 | 2 | 2 |
| | LTW-8701H | Dye | | | | | | |
| Mold releasing agent, lubricant | CS8CP | Calcium montanate | 1 | 1 | 1 | 1 | 1 | 1 |
| | T-1 | Ketone wax | | | | | | |
| Nucleating agent | Talc MS | Talc | 1 | 1 | 1 | 1 | 1 | 1 |
| | 5000S | Talc | | | | | | |
| Light transmittance (%) | | | 54 | 56 | 61 | 34 | 12 | 13 |
| Evaluation of warpage (Max height − Min height) (mm) | | | 0.42 | 0.38 | 0.44 | 0.64 | 0.46 | 0.46 |
| Evaluation of warpage (Max height) (mm) | | | 1.36 | 1.29 | 1.37 | 1.60 | 1.45 | 1.38 |
| Evaluatio of warpage (Min height) (mm) | | | 0.94 | 0.91 | 0.93 | 0.96 | 0.99 | 0.92 |

TABLE 2

| Composition | | | Comparative Example 3 | Comparative Example 4 | Comparative Example 5 | Comparative Example 6 | Comparative Example 7 |
|---|---|---|---|---|---|---|---|
| Polyamide resin | 6000 | MXD6 | 40 | 40 | | | 40 |
| | Synthetic product | MP10 | | | 37 | 37 | |
| | CM3001-N | PA66 | 3 | 3 | | | 3 |
| Glass fiber | T-275H | Glass fiber | 25 | 25 | | | 55 |
| | T-289DE | Glass fiber | | | 30 | 30 | |
| Inorganic filler | B-82 | Muscovite | | | | | |
| | Micalet A-21B | Muscovite | | | | | |
| | 325HK | Phlogopite | | | | | |
| | 200HK | Phlogopite | | | | | |
| | 150-s | Phlogopite | 30 | | | | |
| | TISMO D-101 | Potassium titanate whisker | | 30 | | | |
| | NYGLOS 8 10113 | Wollastonite | | | 30 | | |
| | NYGLOS 4W 10112 | Wollastonite | | | | 30 | |
| LTW dye | LTW-8731H | Dye | 2 | 2 | | | 2 |
| | LTW-8701H | Dye | | | 2 | 2 | |
| Mold releasing agent, lubricant | CS8CP | Calcium montanate | 1 | 1 | | | 1 |
| | T-1 | Ketone wax | | | 0.4 | 0.4 | |
| Nucleating agent | Talc MS | Talc | 1 | 1 | | | 1 |
| | 5000S | Talc | | | 1 | 1 | |
| Light transmittance (%) | | | 14 | 0 | 29 | 28 | 59 |
| Evaluation of warpage (Max height − Min height) (mm) | | | 0.41 | 0.39 | 0.60 | 0.59 | 0.62 |
| Evaluation of warpage (Max height) (mm) | | | 1.39 | 1.39 | 1.59 | 1.58 | 1.63 |
| Evaluatio of warpage (Min height) (mm) | | | 0.98 | 1.00 | 0.99 | 0.99 | 1.01 |

TABLE 3

| Composition | | | Example 5 | Example 6 | Example 7 | Example 8 |
|---|---|---|---|---|---|---|
| Polyamide resin | 6000 | MXD6 | 61.1 | 51.3 | 61.1 | 51.3 |
| | Synthetic product | MP10 | | | | |
| | CM3001-N | PA66 | 2.9 | 2.9 | 2.9 | 2.9 |
| Glass fiber | T-275H | Glass fiber | 24.5 | 24.5 | 24.5 | 24.5 |
| | T-289DE | Glass fiber | | | | |
| Inorganic filler | B-82 | Muscovite | 10.0 | 19.8 | 10.0 | 19.8 |
| | Micalet A-21B | Muscovite | | | | |
| | 325HK | Phlogopite | | | | |
| | 200HK | Phlogopite | | | | |
| | 150-s | Phlogopite | | | | |
| | TISMO D-101 | Potassium titanate whisker | | | | |
| | NYGLOS 8 10113 | Wollastonite | | | | |
| | NYGLOS 4W 10112 | Wollastonite | | | | |
| LTW dye | LTW-8731H | Dye | | | | |
| | LTW-8701H | Dye | | | | |
| | Orasol X45 | Dye | 0.2 | 0.2 | | |
| | Lumogen F4281 | Dye | | | 0.2 | 0.2 |
| Mold releasing agent, lubricant | CS8CP | Calcium montanate | 0.3 | 0.3 | 0.3 | 0.3 |
| | T-1 | Ketone wax | | | | |
| Nucleating agent | Talc MS | Talc | 1.0 | 1.0 | 1.0 | 1.0 |
| | 5000S | Talc | | | | |
| Total | | | 100.0 | 100.0 | 100.0 | 100.0 |
| Light transmittance (%) | | | 47 | 45 | 49 | 47 |
| Evaluation of warpage (Max height − Min height) (mm) | | | 0.48 | 0.54 | 0.46 | 0.36 |
| Evaluation of warpage (Max height) (mm) | | | 1.61 | 1.62 | 1.53 | 1.47 |
| Evaluatio of warpage (Min height) (mm) | | | 1.13 | 1.08 | 1.07 | 1.11 |

TABLE 4

| Composition | | | Example 9 | Example 10 | Example 11 | Example 12 |
|---|---|---|---|---|---|---|
| Polyamide resin | 6000 | MXD6 | | | | |
| | Synthetic product | MP10 | 64.0 | 54.2 | 64.0 | 54.2 |
| | CM3001-N | PA66 | | | | |
| Glass fiber | T-275H | Glass fiber | 24.5 | 24.5 | 24.5 | 24.5 |
| | T-289DE | Glass fiber | | | | |
| Inorganic filler | B-82 | Muscovite | 10.0 | 19.8 | 10.0 | 19.8 |
| | Micalet A-21B | Muscovite | | | | |
| | 325HK | Phlogopite | | | | |
| | 200HK | Phlogopite | | | | |
| | 150-s | Phlogopite | | | | |
| | TISMO D-101 | Potassium titanate whisker | | | | |
| | NYGLOS 8 10113 | Wollastonite | | | | |
| | NYGLOS 4W 10112 | Wollastonite | | | | |
| LTW dye | LTW-8731H | Dye | | | | |
| | LTW-8701H | Dye | | | | |
| | Orasol X45 | Dye | 0.2 | 0.2 | | |
| | Lumogen F4281 | Dye | | | 0.2 | 0.2 |
| Mold releasing agent, lubricant | CS8CP | Calcium montanate | 0.3 | 0.3 | 0.3 | 0.3 |
| | T-1 | Ketone wax | | | | |
| Nucleating agent | Talc MS | Talc | 1.0 | 1.0 | 1.0 | 1.0 |
| | 5000S | Talc | | | | |
| Total | | | 100.0 | 100.0 | 100.0 | 100.0 |
| Light transmittance (%) | | | 56 | 54 | 57 | 53 |
| Evaluation of warpage (Max height − Min height) (mm) | | | 0.45 | 0.38 | 0.40 | 0.40 |
| Evaluation of warpage (Max height) (mm) | | | 1.44 | 1.39 | 1.39 | 1.40 |
| Evaluatio of warpage (Min height) (mm) | | | 0.99 | 1.01 | 0.99 | 1.00 |

As is obvious from the results above, blending of muscovite successfully achieved high light transmittance while suppressing the warpage at low levels (Examples 1 to 12). In contrast, use of mica other than muscovite demonstrated low warpage, but also low light transmittance (Comparative Examples 1 to 3). Use of potassium titanate whisker as the inorganic filler demonstrated extremely low light transmittance (Comparative Example 4). Moreover, use of wollastonite as the inorganic filler demonstrated lower light transmittance than Examples, and also larger warpage (Comparative Examples 5, 6). Use of glass fiber only as the inorganic filler demonstrated high light transmittance, but unfortunately large warpage (Comparative Example 7).

REFERENCE SIGNS LIST 1 reference stage
2 specimen for light-transmitting member
3 highest point
4 warpage

The invention claimed is:

1. A polyamide resin composition comprising a polyamide resin, a glass fiber, a light-transmitting dye, and muscovite,
   wherein the light-transmitting dye is at least one of nigrosine, naphthalocyanine, aniline black, phthalocyanine, porphyrin, perinone, quaterrylene, azo dye, anthraquinone, pyrazolone, squaric acid derivative, perylene, chromium complex, and immonium dye,
   wherein the polyamide resin composition contains carbon black in an amount of 0.0001% by mass or less relative to the total content of the resin composition,
   wherein a content of muscovite in the composition is 25% by mass or more and 40% by mass or less relative to a total content of the resin composition, and
   wherein the glass fiber has a circular cross section.

2. The resin composition of claim 1, demonstrating a light transmittance of 30% or larger, when given in the form of a 1 mm thick formed article and measured at a wavelength of 1070 nm in compliance with ISO 13468-2.

3. The resin composition of claim 1, wherein the polyamide resin comprises a diamine-derived structural unit and a dicarboxylic acid-derived structural unit, 70 mol % or more of the diamine-derived structural unit is derived from xylylenediamine, and 70 mol % or more of the dicarboxylic acid-derived structural unit is derived from straight chain α,ω-dicarboxylic acid having 4 to 20 carbon atoms, and 60 mol % or more of the xylylenediamine-derived structural unit is a metaxylylenediamine-derive structural unit.

4. The resin composition of claim 1, demonstrating a warpage of 1 mm or smaller when given in the form of a 60 mm×60 mm×1 mm thick formed article, where the warpage is difference of height between the highest point and lowest point of the specimen placed on a reference stage.

5. The resin composition of claim 1, wherein the polyamide resin contains a polyamide resin that demonstrates a half-crystallization time of 10 to 60 seconds and a melting point of 200 to 280° C.; where the half-crystallization time is measured by a depolarized light intensity method under conditions involving a temperature 20° C. higher than the melting point of the polyamide resin, a melting time of polyamide resin of 5 minutes, and a crystallization bath temperature of 150° C.

6. The resin composition of claim 1, wherein a content of the glass fiber in the composition is 15 to 35% by mass relative to the total content of the resin composition.

7. The resin composition of claim 1, wherein the glass fiber and muscovite are present in a mass ratio of 1:0.3 to 1:2.0.

8. The resin composition of claim 1, wherein the glass fiber and muscovite are present in a mass ratio of 1:1.0 to 1:2.0.

9. The resin composition of claim 3, wherein a content of the glass fiber in the composition is 15 to 35% by mass relative to the total content of the resin composition.

10. The resin composition of claim 1, wherein a content of the glass fiber in the composition is 20 to 28% by mass relative to the total content of the resin composition.

11. The resin composition of claim 1, which further comprises a mold releasing agent and a lubricant.

12. A formed article formed of a resin composition described in claim 1.

13. A kit comprising a resin composition described in claim 1; and a light-absorbing resin composition that contains a thermoplastic resin and a light-absorbing dye.

14. A method for manufacturing a formed article comprising laser-welding a formed article formed of a resin composition described in claim 1, and a formed article formed of a light-absorbing resin composition that contains a thermoplastic resin and a light-absorbing dye.

15. The resin composition of claim 1, where the polyamide resin composition contains no carbon black.

* * * * *